United States Patent [19]

Planche

[11] 4,425,624
[45] Jan. 10, 1984

[54] DEVICE FOR SIMULATING AN INSTANTANEOUS TEMPERATURE-RISE OF A SEMICONDUCTOR COMPONENT IN ORDER TO PROTECT SAME

[75] Inventor: Jean P. Planche, Les Clayes sous Bois, France

[73] Assignee: La Telemecanique Electrique, France

[21] Appl. No.: 272,224

[22] Filed: Jun. 10, 1981

[30] Foreign Application Priority Data

Jun. 11, 1980 [FR] France .................................. 80 13360

[51] Int. Cl.³ .............................................. G06G 7/62
[52] U.S. Cl. .................................... 364/802; 364/808
[58] Field of Search ............... 364/802, 801, 808, 844, 364/806, 807; 324/71 SN, 104, 105; 328/11

[56] References Cited

U.S. PATENT DOCUMENTS

| | | | |
|---|---|---|---|
| 3,018,051 | 1/1962 | Hemstreet | 364/801 |
| 3,831,014 | 8/1974 | Haid | 364/844 |
| 3,961,173 | 6/1976 | Perry et al. | 364/802 |
| 4,000,410 | 12/1976 | Hentschel et al. | 364/802 |

FOREIGN PATENT DOCUMENTS

| | | | |
|---|---|---|---|
| 2353815 | 10/1973 | Fed. Rep. of Germany | 364/806 |
| 419914 | 8/1974 | U.S.S.R. | 364/806 |
| 475629 | 10/1975 | U.S.S.R. | 364/806 |
| 494751 | 8/1976 | U.S.S.R. | 364/806 |
| 636636 | 4/1977 | U.S.S.R. | 364/802 |
| 691886 | 10/1979 | U.S.S.R. | 364/806 |

OTHER PUBLICATIONS

'Transistor Heat Sink Calculations' by Myron Greenbaum, Electronics, vol. 33, No. 32, Aug. 1960, pp. 36, 66, 68.

Primary Examiner—Mark E. Nusbaum
Assistant Examiner—William G. Niessen
Attorney, Agent, or Firm—William A. Drucker

[57] ABSTRACT

In order to simulate an instantaneous temperature-rise of a thyristor through which flows a current (I), this device takes the mean value (VM) of that current and squares the effective value (EC) thereof. An image of the dissipated power obtained at the output of an adder (S) is applied to devices ($K\tau$ra, $K\tau$br, $K\tau$jb) for simulating radiator-environment, housing-radiator and junction-housing thermal time-constants, respectively. An adder ($S_1$) provides the image i ($\Delta\theta$) of the temperature-rise.

3 Claims, 4 Drawing Figures

DEVICE FOR SIMULATING AN INSTANTANEOUS TEMPERATURE-RISE OF A SEMICONDUCTOR COMPONENT IN ORDER TO PROTECT SAME

BACKGROUND OF THE INVENTION

Thyristors and other semi-conductor power components such as diodes, saturation-undergoing transistors and triacs, are usually dimensioned so as to be able, without the risk of being damaged, to withstand the maximum power they may happen to undergo momentarily. Accordingly, they are fairly oversized with respect to their normal operative power.

In some applications in which currents the value of which may be several times that of the normal operative current (e.g., start-up control, static or hybrid contactors) momentarily flow through the component, it might be an advantage, in order to prevent any oversizing of said component, to be able to obtain an accurate and continuous simulation of the junction temperature-rise, so as to actuate a safety member or an alarm signal whenever a reference temperature that is lower than the maximum temperature permissible is exceeded.

This problem has not yet been solved in a satisfactory manner.

In a semi-conductor power component comprising a housing and a radiator, it is possible, between the junction and the housing bottom, to determine a thermal resistance $R_{jb}$, the value of which is given by the manufacturer. In the same way, it is possible to determine a thermal resistance $R_{br}$ between the housing and the radiator, the value of which can be provided by the manufacturer and a thermal resistance $R_{ra}$ between said radiator and the environment. The latter resistance, as well as $R_{br}$ when its value is not provided by the manufacturer, can be measured by sticking a thermocouple on the elements involved and applying the following formula: $\Delta T = P \times R_{th}$, $R_{th}$ being the thermal resistance to be measured, P the transmitted power and $\Delta T$ the temperature difference between the element's extremities.

Such a measurement, in practice, cannot be made at the scale of a commercial manufacture, since it is difficult to mount the thermocouple in a stable manner unless an important mass is added, which considerably increases the thermal time-constant of the element measured.

It is however possible to carry out such a measurement in a laboratory on a sample of the component.

SUMMARY OF THE INVENTION

The present invention rests on the experimental discovery that the overall instantaneous thermal resistance of an electronic component of the above-mentioned type is approximately given by the following formula:

$$R_{th} = R_{jb}(1 - e^{-t/\tau_{jb}}) + R_{br}(1 - e^{-t/\tau_{br}}) + R_{ra}(1 - e^{-t/\tau_{ra}})$$

in which t designates the time and $\tau_{jb}$, $\tau_{br}$ and $\tau_{ra}$ are the time constants associated with thermal resistances $R_{jb}$, $R_{br}$ and $R_{ra}$ respectively.

OBJECT OF THE INVENTION

The present invention lies in simulating the mean power dissipated by the component and in feeding the image signal of said power into the input of means adapted to simulate the overall instantaneous thermal resistance, in order to obtain an image signal of the temperature-rise undergone by said component.

Therefore, it is an object of the present invention to provide a simulating device comprising:

(a) of means for simulating the instantaneous intensity the current flowing through the component;

(b) means for simulating the mean current and the squared effective current from the image signal of the instantaneous intensity;

(c) means for summing the mean current and the squared effective current, with weighting coefficients representing maximum values guaranteed by the manufacturer, in order to simulate the mean power dissipated by the component;

(d) means for simulating the time-constants of the above-mentioned thermal resistances $R_{jb}$, $R_{br}$, $R_{ra}$, the image signal of said mean power provided by the means under (c) being applied to the input of said means for simulating time constants and (e) means for summing the image signals of the above-mentioned time constants, with weighting coefficients corresponding to the values (given by the manufacturer or previously measured) of said thermal resistances, in order to obtain an image signal of the temperature-rise undergone by the component.

It is known, in the case of a thyristor, that power P is connected to the mean current $I_m$ and to the effective current $I_{eff}$ by the following relation:

$$P = V_o I_m + R_d I^2_{eff}$$

$V_o$ (threshold voltage) and $R_d$ (dynamic resistance) vary from one component to another in a given series; however, their maximum values, guaranteed by the manufacturer, will constitute the weighting coefficients referred to under (c).

In the case of other semi-conductor components of te above-mentioned type comprising a dynamic resistance mounted in series with a voltage drop (possibly nil), independent of the current, there exists equivalent coefficients provided by the manufacturer, e.g. $V_{ce}$ for saturation and $R_{on}$ for a transistor being saturated.

It is to be noted that the values of time constants $\tau_{jb}$, $\tau_{br}$ and $\tau_{ra}$ are quite different from one another, viz. about a fraction of a second as regards the first time-constant, a few seconds as regards the second one and between 50 and 1000 seconds as regards the third one.

While the first two time constants can be simulated by means of simple RC circuits, however it is not the case with the last time constant.

THE PRIOR ART

Accordingly, an important feature of the present invention consists, as regards simulating time constant $\tau_{ra}$, in applying a device of the type described in French patent filed by the applicant on Dec. 7, 1979, under Ser. No. 79 30094 and entitled "Dispositif de simulation d'un phénomène variable dans le temps avec une constante de temps élevée, notamment la température d'une charge électrique" (A device for simulating a time-variable phenomenon with a high time constant, in particular the temperature of an electric charge).

The device comprises a capacitor charged and/or discharged by an input voltage through a resistor and it is characterized by a chopper-switch in series with said resistor and by means for generating periodic pulses adapted to control said chopper-switch.

Other features and advantages of the present invention will appear from the following description given merely by way of example, with reference to the following drawing, in which

DESCRIPTION OF THE PREFERRED EMBODIMENT

Figure 1:
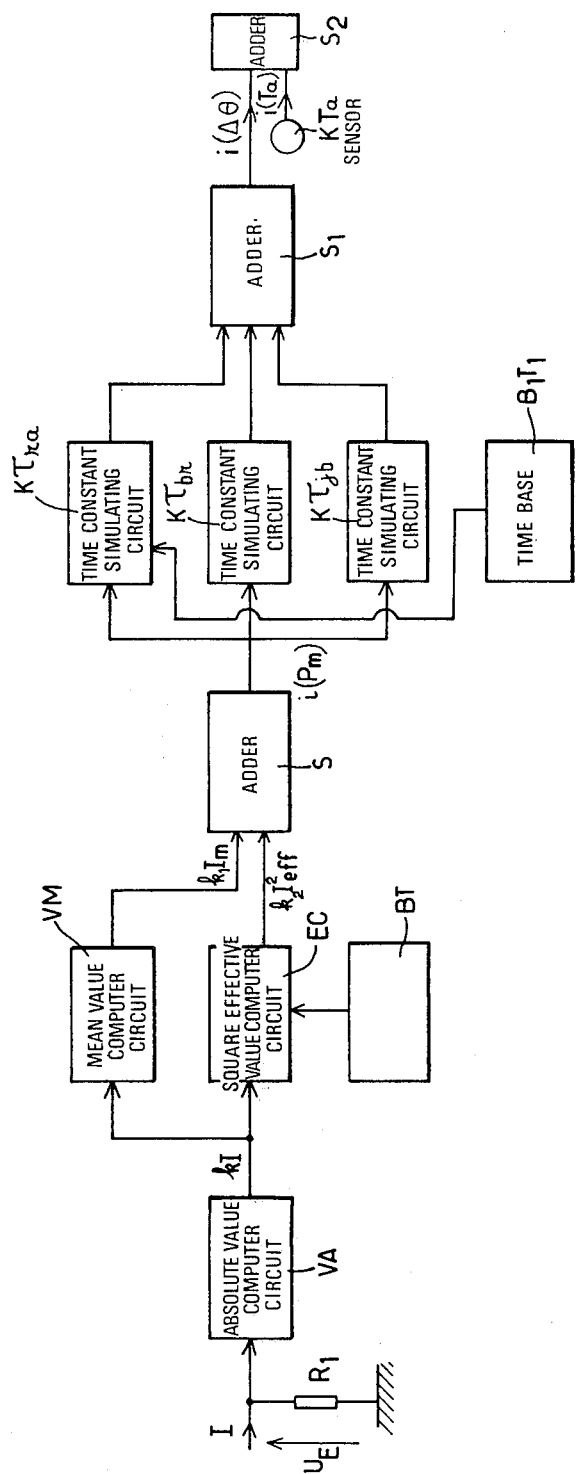
FIG. 1 is a block diagram of a preferred embodiment of a temperature-rise simulating device according to the present invention.

In FIG. 1 are shown a resistor $R_1$ adapted to convert intensity I in the component into a voltage $U_E$ and a circuit VA providing the absolute value kI of $U_E$, k being a constant. The information is transmitted into a circuit VM for calculating mean value $k_1 I_m$, on the one hand, and into a power-raising circuit EC adapted to calculate the square of effective value $k_2 I^2_{eff}$, on the other hand. (The latter circuit is associated with a time base BT).

The mean value and the squared effective value are fed into an adder S with weighting coefficients $k_1$ and $k_2$ permitting to obtain an image signal i (Pm) of the mean power dissipated. That signal is fed into the input of three circuits $K\tau_{ra}$, $K\tau_{br}$, $K\tau_{jb}$ simulating time-constants $\tau_{ra}$, $\tau_{br}$ and $\tau_{jb}$, respectively, and actuated by a time base $B_1T_1$. As explained above, circuits $K\tau_{br}$ and $K\tau_{jb}$ can be of a conventional type with a capacitor-resistor, the third circuit being of the type described in the above-mentioned French patent.

The outputs of said three circuits are fed, with weighting coefficients corresponding to the above-mentioned three terminal resistances, into an adder $S_1$, the output of which provides an image signal i ($\Delta\theta$) of the temperature rise of the semi-conductor component junction.

Figure 2:
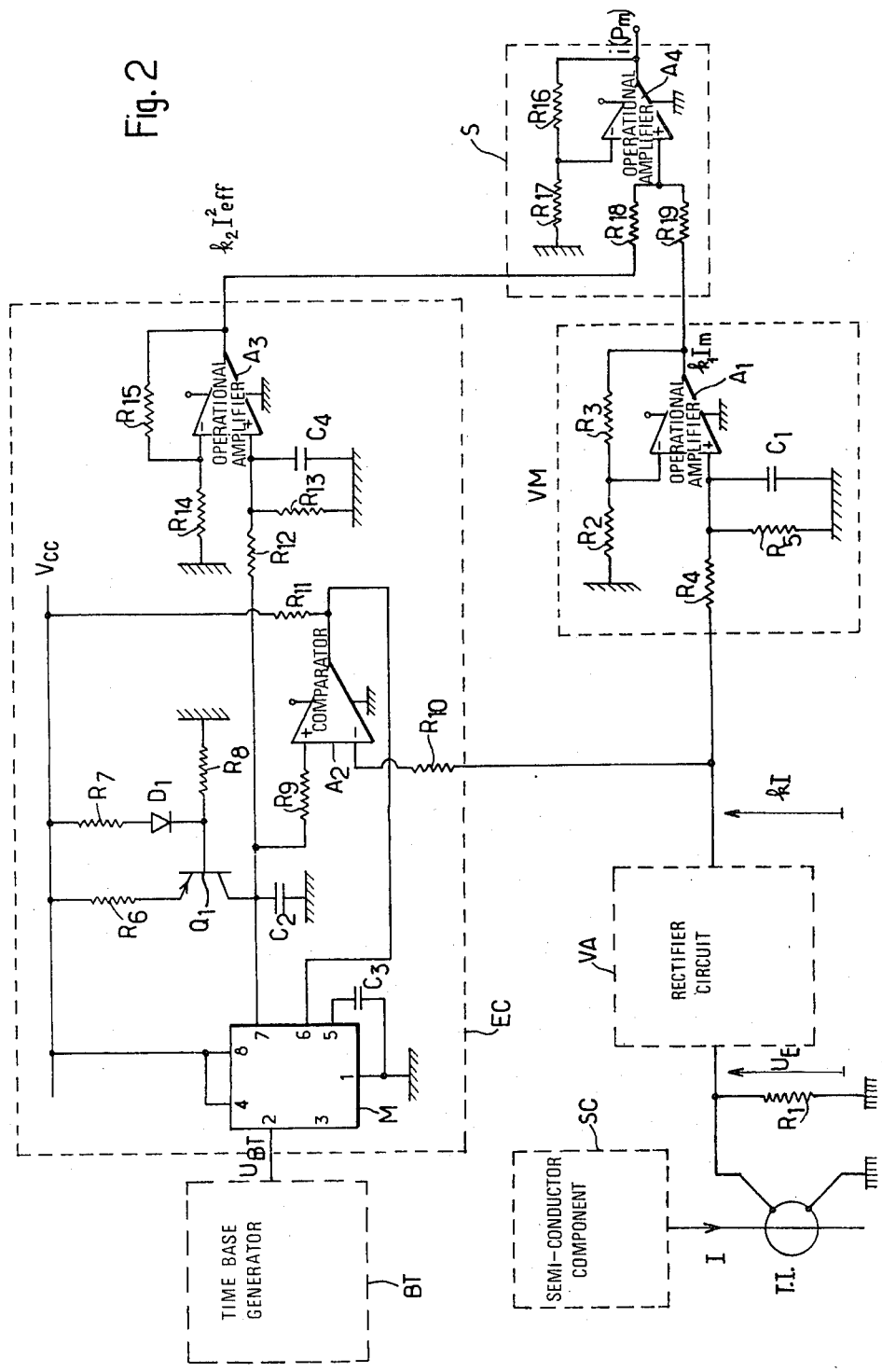
FIG. 2 shows a preferred embodiment of the circuits for simulating the mean power.
Figure 3:
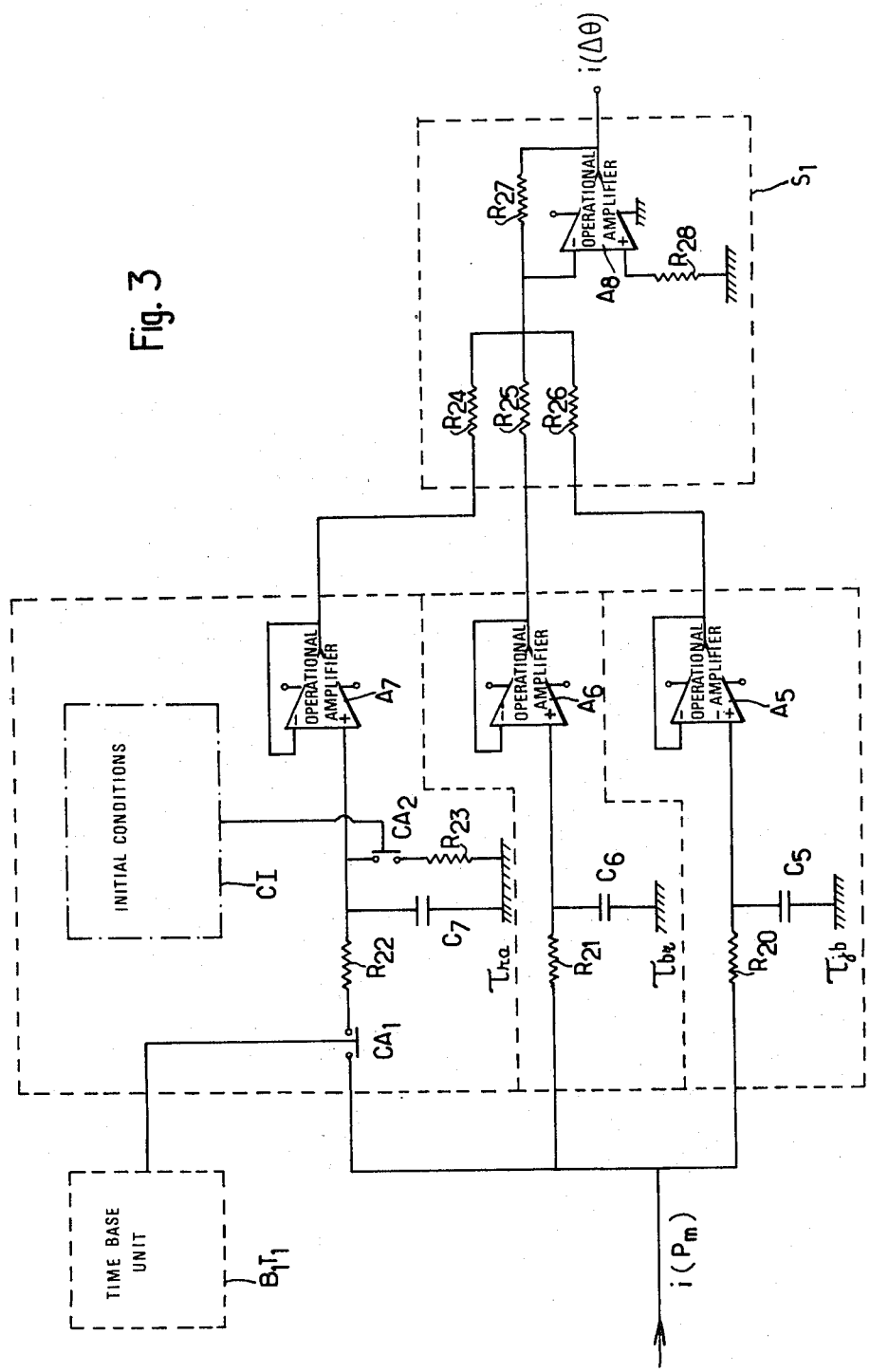
FIG. 3 shows a preferred embodiment of the circuits for simulating the time constants and the temperature-rise image.

The various functions described above can be carried out in the following way:

The current-intensity I in component SC can be read by means of a current-transformer T.I. (FIG. 2) and converted into a voltage $U_E$ by means of resistor $R_1$.

The circuit VA for providing the absolute value is of a conventional type (rectifier without threshold).

The mean value VM circuit is constituted by an operational amplifier $A_1$, the gain of which is determined by a divider constituted by resistors $R_2$ and $R_3$.

Resistors $R_4$ and $R_5$ and a capacitor $C_1$ constitute a filter permitting to take the mean value of signal kI.

Time-base BT is a generator providing square signals with a low cyclic ratio actuating circuit EC, so as to set in the "on" state the monostable trigger unit M contained in EC, e.g. of the LM 555—type.

Monostable trigger unit M periodically discharges a capacitor $C_2$, the latter being charged by a constant current by means of a transistor $Q_1$.

The charge current is determined by a resistor $R_6$ and a base divider bridge constituted by resistors $R_7$, $R_8$ and a diode $D_1$. The latter diode is adapted to make up for the variations of the transistor base-emitter voltage with respect to temperature.

The voltage at the terminals of $C_2$ is fed (through a resistor $R_9$) into the positive input of a comparator $A_2$, the output of which is switched whenever the voltage at said positive input is higher than voltage kI fed into the negative input through a resistor $R_{10}$.

The positive-going edge of the input of $A_2$ is fed into plug 6 of M and causes capacitor $C_2$ to be discharged.

Figure 4:
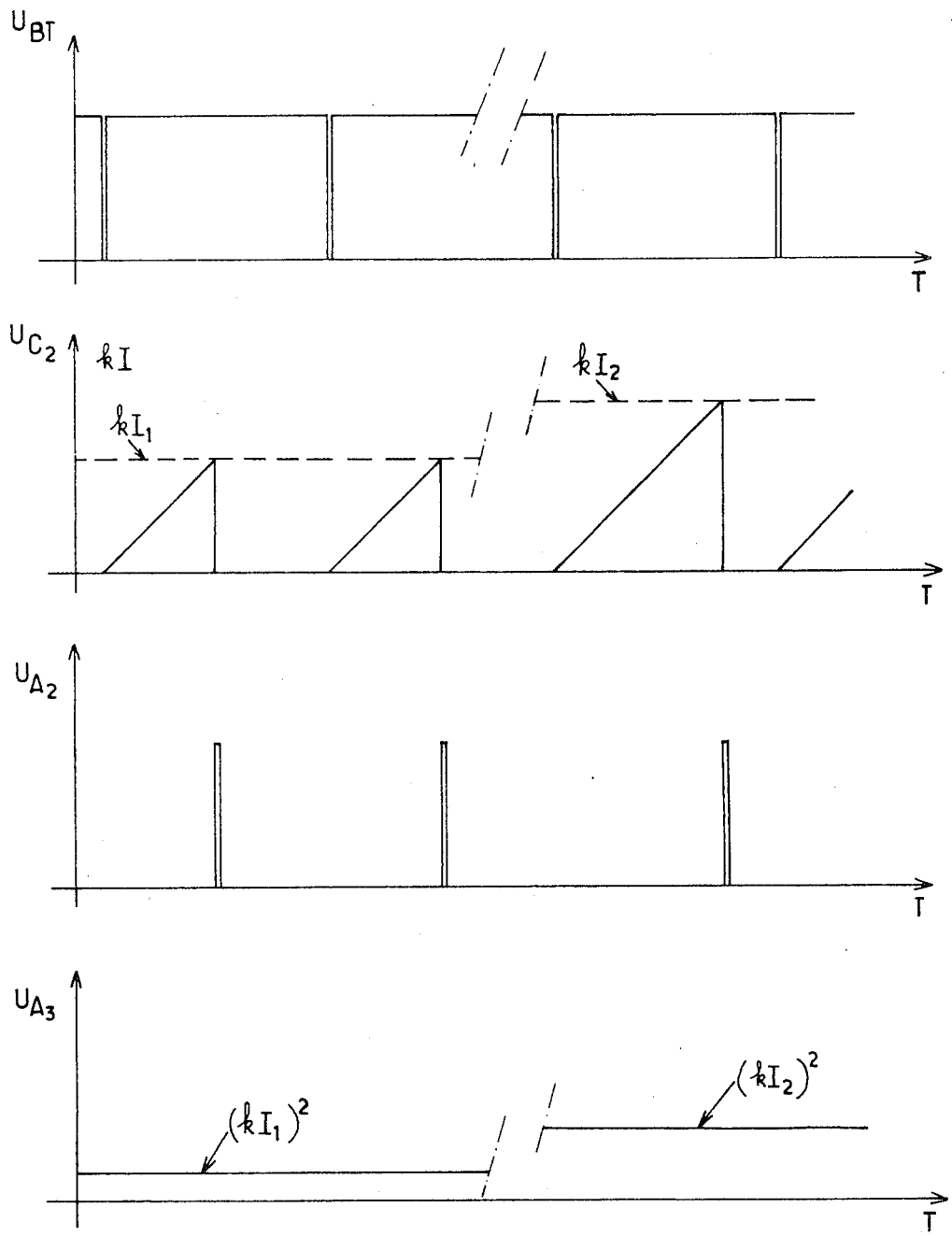
FIG. 4 represents various waveforms in various portions of said circuits.

Capacitor $C_2$ will not be allowed to be charged until is formed a negative-going edge of time base BT (see FIG. 4).

A capacitor $C_3$ permits to improve stability.

Resistor $R_{11}$ is the load resistor of the comparator outlet stage.

The time-interval for charging capacitor $C_2$ is proportional to voltage kI, as well as its magnitude. The area of the triangle thus described is therefore proportional to the square of the current value. Said voltage is picked up by a divider-bridge $R_{12} R_{13}$ and it is filtered by a capacitor $C_4$, in order to be fed into an operational amplifier $A_3$.

The output of operational amplifier $A_3$, the gain of which is determined by a divider-bridge $R_{14} R_{15}$, is therefore proportional to the square of the effective current.

A operational amplifier $A_4$, the gain of which is determined by a divider-bridge constituted by resistors $R_{16}$, $R_{17}$, receives, at its positive input, the output signals of $A_3$ and $A_1$, duly weighted by resistors $R_{18}$ and $R_{19}$ respectively.

The output voltage of $A_4$ is thus the image of the mean power in the semi-conductor.

The junction-housing time constant $\tau_{jb}$ is provided by a resistor $R_{20}$ and a capacitor $C_5$ charged by an operational amplifier $A_5$, mounted as a follower.

The housing-radiator time constant $\tau_{br}$ is provided by a resistor $R_{21}$ and a capacitor $C_6$ charged by an operational amplifier $A_6$ mounted as a follower.

The radiator-environment time constant $\tau_{ra}$ is provided by a resistor $R_{22}$ and a capacitor $C_7$ and by a chopping device constituted by a time-base $B_1T_1$ adapted to deliver square signals with a low cyclic ratio (e.g. 1/1000), the time period of which is about 1 second.

Said signals are adapted to control an analog switch $CA_1$.

That device permits to multiply time constant $R_{22} \times C_7$ artificially by the cyclic ratio of time-base $B_1T_1$.

The voltage at the terminals of capacitor $C_7$ is picked up by an operational amplifier $A_7$, possibly of the field-effect transistor type, mounted as a follower.

A resistor $R_{23}$ permits to discharge capacitor $C_7$ through a second analog switch $CA_2$, according to the initial conditions (diagramatically shown by rectangle CI).

The ouputs of the three follower stages $A_7$, $A_6$ and $A_5$ are fed into an operational amplifier $A_8$, via input resistors $R_{24}$, $R_{25}$, $R_{26}$ respectively.

These resistors determine the weight of each thermal resistance with respect to the overall thermal resistance.

$R_{27}$ is a gain resistor, $R_{28}$ is a resistor for compensating the drift current of amplifier $A_8$.

The output amplifier $A_8$ is thus proportional in instantaneous value to the temperature rise of the semiconductor component junction.

For the time-range during which the validity of such a simulation is desired and for certain types of semiconductor components, it is possible to do without time-constant circuits $\tau_{jb}$ and $\tau_{br}$, taking into account only the final value of the corresponding time constants.

In FIG. 1 is shown a sensor KTa for measuring room temperature Ta, said sensor being constituted e.g.; by a resistor with a negative temperature coefficient. The image current of Ta is added, in an adder $S_2$, to the image current of temperature-rise $\Delta\theta$ in order to provide the image of the junction actual temperature. It is thus possible to use the component to the utmost, in particular whenever the room temperature is relatively low.

What is claimed is:

1. A device for simulating an instantaneous temperature-rise of a semi-conductor power component in a predetermined environment in order to protect same, said component having a semi-conductor junction, a housing and a radiator, said device comprising in combination:
    (a) first means (TI, R1), for simulating the instantaneous intensity I of the current flowing through said component;
    (b) second and third means (VM and EC) connected to the first means for respectively simulating the mean value of the said current intensity and the square $I^2_{eff}$ of the effective current;
    (c) fourth means (S) connected to the second and third means for summing up said mean current intensity Im and said square $I^2_{eff}$ of the effective current, with respective weighting coefficients representing predetermined maximum values, in order to simulate the mean power dissipated by said component;
    (d) fifth, sixth and seventh means ($K\tau_{jb}$, $K\tau_{br}$ and $K\tau_{ra}$ respectively) connected to said fourth means for simulating the respective time constants of the thermal resistances ($R_{jb}$, $R_{br}$ and $R_{ra}$) between the junction and the housing bottom, between the housing and the radiator and between the radiator and the environment; said fifth, sixth and seventh means respectively providing image signals of the said time constants; and
    (e) eighth means ($S_1$) connected to the fifth, sixth and seventh means, for summing up the said image signals of the respective time constants, with weighting coefficients corresponding to predetermined values of said thermal resistances, said eighth means having an output, whereby an image signal of the temperature-rise undergone by said component is obtained at the output of the said eighth means, wherein said seventh means ($K\tau_{ra}$) for simulating the time-constant of the thermal resistance between the radiator and the environment comprise a capacitor (C7), first circuit means, connected to the said fourth means, for charging said capacitor and second circuit means for discharging said capacitor, said first circuit means comprising a first resistor ($R_{22}$) and a first chopper-switch ($CA_1$), mounted in series with said resistor, and means ($B_1T_1$) for generating periodic pulses adapted to control said first chopper-switch and said second circuit means comprising a second resistor ($R_{23}$) and a second chopper-switch ($CA_2$) connected in series with said second resistor.

2. A device according to claim 1, wherein said means for simulating the square of the effective current comprise a monostable trigger unit (M) having an output, a set input and a reset input, a time-base generator (BT) connected to the set input of said monostable trigger unit, a capacitor ($C_2$) connected to the output of the monostable trigger unit for being periodically discharged, circuit means for charging the said capacitor with a constant current, said circuit means comprising a transistor ($Q_1$); a comparator ($A_2$) having a first input connected to the said capacitor ($C_2$), said capacitor having a second input and an output, and means for applying to the second input of the said comparator the absolute value (kI) of the said instantaneous intensity (I), the output of the said comparator being connected to the reset input of the said monostable trigger unit.

3. A device for simulating the temperature of the junction of a semi-conductor power component in a predetermined environment in order to protect same, said component having a semi-conductor junction, a housing and a radiator, said device comprising in combination:
    (a) first means (TI, R1), for simulating the instantaneous intensity (I) of the current flowing through said component;
    (b) second and third means (VM and EC) connected to the first means for respectively simulating the mean value of the said current intensity and the square ($I^2_{eff}$) of the effective current;
    (c) fourth means (S) connected to the second and third means for summing up said mean current intensity (Im) and said square ($I^2_{eff}$) of the effective current, with respective weighting coefficients representing predetermined maximum values, in order to simulate the mean power dissipated by said component;
    (d) fifth, sixth and seventh means ($K\tau_{rb}$, $K\tau_{br}$ and $K\tau_{ra}$ respectively) connected to said fourth means for simulating the respective time constants of the thermal resistances ($R_{jb}$, $R_{br}$ and $R_{ra}$) between the junction and the housing bottom, between the housing and the radiator and between the radiator and the environment; said fifth, sixth and seventh means respectively providing image signals of the said time constants; and
    (e) eighth means ($S_1$) connected to the fifth, sixth and seventh means, for summing up the said image signals of the respective time constants, with weighting coefficients corresponding to predetermined values of said thermal resistances, said eighth means having an output, whereby an image signal of the temperature-rise undergone by said component is obtained at the output of the said eighth means, wherein said seventh means ($K\tau_{ra}$) for simulating the time constant of the thermal resistance between the radiator and the environment comprise a capacitor (C7), first circuit means, connected to the said fourth means, for charging said capacitor and second circuit means for discharging said capacitor, said first circuit means comprising a first resistor ($R_{22}$) and a first chopper-switch ($CA_1$), mounted in series with said resistor, and means ($B_1T_1$) for generating periodic pulses adapted to control said first chopper-switch and said second circuit means comprising a second resistor ($R_{23}$) and a second chopper-switch ($CA_2$) connected in series with said second resistor; said device further comprising further adder means ($S_2$) having first and second inputs, the first input of said further adder means being connected to the output of said eighth means, and sensor means converting the temperature (Ta) of the said predetermined environment into a further image signal (iTa), said sensor means being connected to the second input of said further adder means.

* * * * *